(12) United States Patent
Fu

(10) Patent No.: US 12,498,624 B2
(45) Date of Patent: Dec. 16, 2025

(54) WHEEL MANUFACTURING METHOD, WHEEL, AND PROJECTION APPARATUS

(71) Applicant: Coretronic Corporation, Hsin-Chu (TW)

(72) Inventor: Tsung-Hsiang Fu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 498 days.

(21) Appl. No.: 17/964,929

(22) Filed: Oct. 13, 2022

(65) Prior Publication Data

US 2023/0117624 A1 Apr. 20, 2023

(30) Foreign Application Priority Data

Oct. 15, 2021 (CN) .......................... 202111201292.1

(51) Int. Cl.
*G03B 21/16* (2006.01)
*G03B 21/20* (2006.01)
(52) U.S. Cl.
CPC ......... *G03B 21/16* (2013.01); *G03B 21/2033* (2013.01)
(58) Field of Classification Search
CPC ............................. G03B 21/16; G03B 21/2033
USPC ........................................................ 353/84
See application file for complete search history.

(56) References Cited

U.S. PATENT DOCUMENTS

2019/0331989 A1* 10/2019 Chen ................... G03B 21/204
2020/0058830 A1 2/2020 Furuyama

FOREIGN PATENT DOCUMENTS

| CN | 105093776 A | 11/2015 | | |
|---|---|---|---|---|
| CN | 105762239 | 7/2016 | | |
| CN | 106931331 | 7/2017 | | |
| CN | 110412816 A | 11/2019 | | |
| CN | 111830773 A | 10/2020 | | |
| JP | 2004313840 A | * | 11/2004 | |
| JP | 2008205453 A | * | 9/2008 | |
| WO | WO-2013021870 A1 | * | 2/2013 | ............. H01L 23/36 |

OTHER PUBLICATIONS

Translation of JP 2004313840 (Year: 2025).*
Translation of JP 2008205453 (Year: 2025).*
Translation of WO 2013021870 (Year: 2025).*
"Office Action of China counterpart Application", issued on Jul. 18, 2025, p. 1-p. 11.

* cited by examiner

*Primary Examiner* — Jerry L Brooks
(74) *Attorney, Agent, or Firm* — JCIPRNET

(57) ABSTRACT

A wheel manufacturing method, a wheel, and a projection apparatus are provided. The wheel manufacturing method includes the following. First, a substrate is provided. Next, a thermal conductivity film is formed on at least one surface of the substrate; the thermal conductivity film is formed by using cold spray or supersonic laser deposition to contact multiple thermally conductive particles with the substrate, the thermally conductive particles in the thermal conductivity film occupy >95% of a volume of the thermal conductivity film, and the thermal conductivity film has a void rate of <1%. Next, an optical layer is formed on the substrate or the thermal conductivity film. The wheel, the manufacturing method thereof, and the projection apparatus including the wheel provided by the invention have good thermal conductivity.

20 Claims, 14 Drawing Sheets

WHEEL MANUFACTURING METHOD, WHEEL, AND PROJECTION APPARATUS

CROSS-REFERENCE TO RELATED APPLICATION

This application claims the priority benefit of China application serial no. 202111201292.1, filed on Oct. 15, 2021. The entirety of the above-mentioned patent application is hereby incorporated by reference herein and made a part of this specification.

BACKGROUND

Technical Field

The invention relates to an optical projection apparatus and a manufacturing method thereof, and in particular to a wheel manufacturing method, a wheel, and a projection apparatus.

Description of Related Art

In a wheel (such as phosphor wheel) using in existing technology, an aluminum alloy substrate is mostly used as a heat dissipation substrate, because compared with other metal substrates (for example, metal substrates such as copper, silver, or gold substrates), the aluminum alloy substrate has a lower density, a lighter weight, and a lower cost. However, the thermal conductivity of the aluminum alloy substrate is worse than that of other metal substrates. In order to overcome the above issue, in a conventional technology, the thermal conductivity of the wheel is enhanced by forming a thermally conductive layer on at least one surface of the aluminum alloy substrate. However, in the thermally conductive layer of the conventional technology, a cavity is likely to be formed in the heat-conducting layer, and a glue layer is required to be disposed between the heat-conducting layer and the aluminum alloy substrate, so that the heat-conducting layer and the aluminum alloy substrate may adhere to each other. The above two situations limit the heat conduction effect improved by disposing the heat conduction layer.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a wheel, a manufacturing method thereof, and a projection apparatus which includes the wheel. The wheel provided by the invention has good thermal conductivity.

Other objectives and advantages of the invention may be further understood from the technical features disclosed by the invention.

In order to achieve one or part or all of the above-mentioned purposes or other purposes, an embodiment of the invention proposes a wheel manufacturing method, which includes the following. First, a substrate is provided. Next, a thermal conductivity film is formed on at least one surface of the substrate; the thermal conductivity film is formed by using cold spray or supersonic laser deposition to contact a plurality of thermally conductive particles with the substrate, the plurality of thermally conductive particles in the thermal conductivity film occupy >95% of a volume of the thermal conductivity film, and the thermal conductivity film has a void rate of <1%. Next, an optical layer is formed on the substrate or the thermal conductivity film.

In an embodiment of the invention, the thermal conductivity film and the optical layer are formed on a same surface of the substrate, and the thermal conductivity film is disposed between the substrate and the optical layer.

In an embodiment of the invention, the thermal conductivity film and the optical layer are respectively formed on opposite surfaces of the substrate.

In an embodiment of the invention, the thermal conductivity film includes a first thermal conductivity film and a second thermal conductivity film respectively formed on opposite surfaces of the substrate, and the first thermal conductivity film is disposed between the substrate and the optical layer.

In an embodiment of the invention, a number of the thermal conductivity film is multiple, a plurality of the thermal conductivity films are formed on at least one surface of the substrate, and the thermal conductivity films are disposed on the substrate in such a way that a thermal conductivity of the thermal conductivity films is from low to high.

In order to achieve one or part or all of the above objectives or other objectives, an embodiment of the invention proposes a wheel including a substrate, a thermal conductivity film, and an optical layer. The thermal conductivity film is disposed on at least one surface of the substrate and is in contact with the substrate. The thermal conductivity film includes a plurality of thermally conductive particles, and the plurality of thermally conductive particles in the thermal conductivity film occupy >95% of a volume of the thermal conductivity film, and the thermal conductivity film has a void rate of <1%. The optical layer is disposed on the substrate or the thermal conductivity film.

In an embodiment of the invention, the thermal conductivity film and the optical layer are disposed on a same surface of the substrate, and the thermal conductivity film is located between the substrate and the optical layer.

In an embodiment of the invention, the thermal conductivity film and the optical layer are respectively disposed on opposite surfaces of the substrate.

In an embodiment of the invention, the thermal conductivity film includes a first thermal conductivity film and a second thermal conductivity film respectively disposed on opposite surfaces of the substrate, and the first thermal conductivity film is located between the substrate and the optical layer.

In an embodiment of the invention, a number of the thermal conductivity film is multiple, a plurality of the thermal conductivity films are disposed on at least one surface of the substrate, and the thermal conductivity films are disposed on the substrate in such a way that a thermal conductivity of the thermal conductivity films is from low to high.

In an embodiment of the invention, the thermally conductive particles of the thermal conductivity film include a metal particle, an inorganic particle, or a combination thereof.

In an embodiment of the invention, the metal particle includes a copper particle, a silver particle, a gold particle, or a combination thereof, and the inorganic particle includes a graphene particle, a diamond particle, or a combination thereof.

In an embodiment of the invention, a purity of the thermally conductive particles included in the thermal conductivity film is >99.5%.

In an embodiment of the invention, the thermal conductivity film includes first thermally conductive particles and second thermally conductive particles, and a volume ratio of the first thermally conductive particles to the second thermally conductive particles is 1:9 to 9:1.

In an embodiment of the invention, a thermal conductivity of the thermal conductivity film is 300 to 5000 W/m·K.

In an embodiment of the invention, a bonding strength between the thermally conductive particles is 10 to 50 MPa.

In an embodiment of the invention, a surface of the substrate has a plurality of voids, a depth of the voids is 20 to 60 μm, the substrate has a void rate of 30 to 50%, and the plurality of voids are filled by the thermal conductivity film.

In an embodiment of the invention, a particle size of the thermally conductive particles is 0.005 to 0.05 mm.

In an embodiment of the invention, the thermal conductivity film has a maximum height roughness of >30 μm, and the thermal conductivity film has an arithmetic average roughness of >5 μm.

In order to achieve one or part or all of the above objectives or other objectives, an embodiment of the invention proposes a projection apparatus including a light source module, a wheel, a light valve, and a projection lens. The light source module is configured to provide an excitation beam. The wheel is disposed on a transmission path of the excitation beam, and the wheel includes a substrate, a thermal conductivity film, and an optical layer. The thermal conductivity film is disposed on at least one surface of the substrate and is in contact with the substrate. The thermal conductivity film includes a plurality of thermally conductive particles, and the thermally conductive particles in the thermal conductivity film occupy >95% of a volume of the thermal conductivity film, and the thermal conductivity film has a void rate of <1%. The optical layer is disposed on the substrate or the thermal conductivity film, and the excitation beam incident on the optical layer is converted to a converted beam. The light valve is disposed on a transmission path of the excitation beam and the converted beam, and the light valve is configured to convert the excitation beam and the converted beam to an image beam. The projection lens is disposed on a transmission path of the image beam, and the projection lens is configured to project the image beam out of the projection apparatus.

Based on the above, the embodiment of the invention has at least one of the advantages or effects as described below. Compared with the prior art, in the wheel manufacturing method provided in an embodiment, cold spray or supersonic laser deposition is used to form the thermal conductivity film. The thermal conductivity film formed by the above process does not need a glue layer to be firmly fixed on the substrate, and the thermal conductivity film that is formed has a void rate of <1%, so that compared with a conventional thermal conductive layer having a glue layer, the thermal conductivity film is not affected by material characteristics (such as heat resistance, curing temperature, etc.) of the glue layer, and the thermal conductivity film includes almost no cavity formed by air. The wheel of each embodiment of the invention has better heat conduction effect. In addition, since the driving element (such as a motor) of the wheel of each embodiment of the invention does not need to bear the weight of the glue layer, the burden on the driving element is reduced and the life span of the driving element is increased. Furthermore, multiple thermally conductive particles included in the thermal conductivity film that is formed in each embodiment occupy >95% of the volume of the thermal conductivity film, so the thermal conductivity film includes almost no impurity and therefore has better thermal conductivity effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
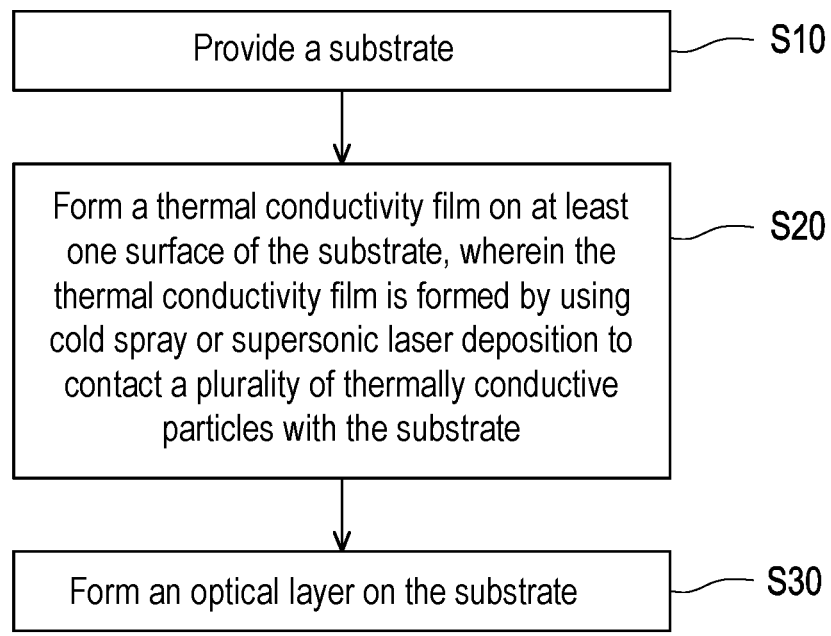
FIG. 1 is a flow chart of a wheel manufacturing method according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Further, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Further, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Reference will now be made to the exemplary embodiment of the invention in detail, and examples of the exemplary embodiment are illustrated in the accompanying drawings. Whenever possible, same reference numerals are used in the drawings and descriptions to indicate same or similar parts. The invention may be embodied in various forms and should not be limited to the embodiments described in this document. The thickness of layers and regions in the drawings is exaggerated for clarity. The same or similar reference numerals indicate the same or similar elements, which will not be repeated in the following paragraphs. In addition, the directional terms mentioned in the embodiments, such as up, down, left, right, front, or back, are only the directions with reference to the drawings. Therefore, the directional terms used are used to illustrate and not to limit the invention.

Referring to FIG. 1, FIG. 1 is a flow chart of a wheel manufacturing method according to an embodiment of the invention. In step S10, a substrate is provided. A material of the substrate is a material with good thermal conductivity and heat resistance, such as an aluminum alloy.

In step S20, a thermal conductivity film is formed on at least one surface of the substrate. In this embodiment, the thermal conductivity film is formed by using cold spray or supersonic laser deposition (SLD) to contact a plurality of thermally conductive particles with the substrate. The principle of cold spray is to use helium (He) as a carrier gas to emit the thermally conductive particles onto the surface of the substrate at supersonic speed at room temperature or close to room temperature, so that the thermally conductive particles may adhere onto the substrate to form the thermal conductivity film. Since step S20 is carried out at room temperature or close to room temperature, the thermal conductivity particles do not melt, and thus it is easy to control the shape of the thermal conductivity film to be formed. In addition, the pressure of the carrier gas is about 0.5 to 1.0 MPa. Due to the impact force given by the supersonic gas flow, there is almost no void between the thermally conductive particles, so that the thermal conductivity film that is formed is dense, and there is no space for any impurity between the thermally conductive particles. In addition, supersonic laser deposition is a composite technology process that includes the above-mentioned cold spray. In supersonic laser deposition, laser is configured to heat and spray the thermally conductive particles during the cold spray process, so that the thermally conductive particles and the substrate may be effectively softened, which may enhance the deformation ability of thermally conductive particles and the substrate, and greatly reduce the deposition rate required for the thermally conductive particles. Therefore, compared with the cold spray, the supersonic laser deposition may reduce the speed of the carrier gas, so that the type of carrier gas selected and the operation process are more flexible. For example, the carrier gas used in the supersonic laser deposition may be nitrogen (N) or air which is other than helium. Based on this, a user may choose cold spray or supersonic laser deposition to form the thermal conductivity film according to the process conditions. In this embodiment, since the above-mentioned cold spray or supersonic laser deposition are used to form the thermal conductivity film, a plurality of thermal conductivity particles in the thermal conductivity film occupy >95% of the volume of the thermal conductivity film, the purity of the plurality of thermal conductivity particles included in the thermal conductivity film is >99.5%, and the thermal conductivity film has a void rate of <1% and a thermal conductivity of 300 to 5000 W/m·K. In addition, in the process of cold spray or supersonic laser deposition, bond is formed between the thermally conductive particles or between the thermally conductive particles and the substrate, so that the thermally conductive particles are firmly adhered onto the substrate. In some embodiments, the bonding strength between the plurality of thermally conductive particles or between the thermally conductive particles and the substrate is 10 to 50 Mpa, so that the wheel has sufficient adhesion when rotating at high speeds.

In some embodiments, two or more thermal conductivity films may be formed on the substrate by cold spray or supersonic laser deposition, and multiple thermal conductivity films have different kinds of thermal conductivity particles. For example, a first thermal conductivity film and a second thermal conductivity film may be sequentially formed on the substrate, and the first thermal conductivity film is closer to the substrate than the second thermal conductivity film. The thermal conductivity of the first thermal conductivity film and the second thermal conductivity film is also between 300 to 5000 W/m·K. In addition, in order to optimize thermal conductivity, the thermal conductivity of the first thermal conductivity film may be smaller than the thermal conductivity of the second thermal conductivity film.

In step S30, an optical layer is formed on the substrate or the thermal conductivity film. In some embodiments, the optical layer may include a reflective layer, a wavelength conversion layer, or a combination thereof, and the invention is not limited thereto. In some embodiments, a manufacturing method of the reflective layer is, for example, mixing an adhesive with diffuse reflection particles and coating on a forming surface, and then performing heating and curing. In addition, in some embodiments, a manufacturing method of the wavelength conversion layer is, for example, high-temperature sintering of glass mixed with an inorganic fluorescent material, low-temperature sintering of an alcohol-soluble inorganic adhesive mixed with an inorganic fluorescent material, or low-temperature sintering of a water-based inorganic adhesive mixed with an inorganic fluorescent material to form the same on the substrate. It is to be noted that the manufacturing methods of the reflective layer and the wavelength conversion layer mentioned above are only examples, and the invention is not limited thereto.

Based on the above, since in the wheel manufacturing method of this embodiment, cold spray or supersonic laser deposition is used to form the thermal conductivity film, the thermal conductivity film formed by the above process does not need a glue layer to be firmly fixed on the substrate, and the thermal conductivity film that is formed has a void rate of <1%. Therefore, compared with a conventional heat-conducting layer, the thermal conductivity film formed by this embodiment almost includes no cavity formed by air and has better heat-conducting effect. Furthermore, the thermal conductivity film formed by this embodiment includes a plurality of thermally conductive particles occupying >95% of the volume of the thermal conductivity film, so the thermal conductivity film almost includes no impurity and therefore has better thermal conductivity effect.

FIGS. 2 to 37 respectively illustrate a schematic cross-sectional view of a portion of a wheel according to each embodiment of the invention. Aspects of the wheel the invention will be explained in the following in detail.

Figure 2:
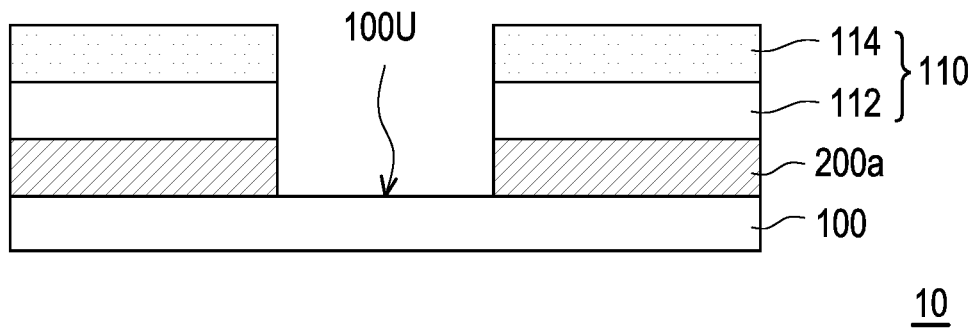
FIGS. 2 to 37 illustrate schematic cross-sectional views of a portion of a wheel according to each embodiment of the invention.

Referring to FIG. 2, a wheel 10 of this embodiment includes a substrate 100, a thermal conductivity film 200*a*, and an optical layer 110. The wheel 10 may be, for example, a fluorescent wheel or a wavelength conversion element, and the invention is not limited thereto.

A material of the substrate 100 is, for example, a material with good thermal conductivity and heat resistance. The material of the substrate 100 of this embodiment is an aluminum alloy. In other embodiments, the substrate 100 has a plurality of voids, and has a specific void rate and roughness, which will be described in other embodiments below.

The thermal conductivity film 200a is, for example, disposed on at least one surface of the substrate 100 and is in contact with the substrate 100. In this embodiment, the thermal conductivity film 200a is disposed on an upper surface 100U of the substrate 100 and is in contact with the substrate 100. The thermal conductivity film 200a includes a plurality of thermally conductive particles, such as metal particles, inorganic particles, or a combination thereof. In some embodiments, the metal particles include a copper particle, a silver particle, a gold particle, or a combination thereof, and the inorganic particles include a graphene particle, a diamond particle, or a combination thereof. In this embodiment, the thermal conductivity film 200a includes a plurality of copper particles with good thermal conductivity. In addition, the particle size of the plurality of thermally conductive particles as described above may be, for example, 0.005 to 0.05 mm. In addition, as described in the aforementioned embodiment, the plurality of thermally conductive particles in the thermal conductivity film 200a occupy >95% of the volume of the thermal conductivity film 200a, and the purity of the plurality of thermally conductive particles included in the thermal conductivity film 200a is >99.5%. In addition, the thermal conductivity film 200a has a void rate of <1% and a thermal conductivity of 300 to 5000 W/m·K, and the bonding strength between the plurality of thermally conductive particles is 10 to 50 MPa. Since the thermal conductivity film 200a of this embodiment has a void rate of <1%, the thermal conductivity film 200a almost has no cavity formed by air, thereby avoiding the thermal conductivity of the thermal conductivity film 200a from being reduced. In some embodiments, since the thermal conductivity film 200a does not need to contain a glue layer to be firmly fixed to the substrate 100, it is not necessary to form a thinner thermally conductive layer as in the conventional technology to avoid the situation of the glue layer in the thermally conductive layer causing poor thermal conductivity. The thickness of the thermal conductivity film 200a of the embodiment ranges from 0.05 to 0.50 mm, and the thermal conductivity film 200a of the embodiment has better process flexibility. In addition, in some embodiments, the thermal conductivity film 200a may have a certain degree of surface roughness to further enhance the thermal conductivity of the surface of the thermal conductivity film 200a. In this embodiment, the thermal conductivity film 200a has a maximum height roughness of >30 μm, and an arithmetic average roughness of >5 μm.

The optical layer 110 is, for example, disposed on the substrate 100 or the thermal conductivity film 200a. In this embodiment, the optical layer 110 is disposed on and in contact with the thermal conductivity film 200a. In this embodiment, the optical layer 110 includes a reflective layer 112 and a wavelength conversion layer 114, and the reflective layer 112 is disposed between the substrate 100 and the wavelength conversion layer 114. In some embodiments, the reflective layer 112 may be a mirror reflective layer, and a material of the reflective layer 112 may include silver. In other embodiments, the reflective layer 112 may be a diffuse reflective layer, and a material of the reflective layer 112 may include diffuse reflection particles such as titanium dioxide, zirconium dioxide, or a combination thereof. The reflective layer 112 may be configured to reflect a beam passing through the wavelength conversion layer 114 back to the wavelength conversion layer 114, thereby improving light conversion efficiency of the wavelength conversion layer 114. The wavelength conversion layer 114 may, for example, include a wavelength conversion material and an adhesive, and the wavelength conversion material may be an inorganic fluorescent material. In addition, in some embodiments, the wavelength conversion layer 114 may include a first wavelength conversion layer and a second wavelength conversion layer. The first wavelength conversion layer and the second wavelength conversion layer may convert an excitation beam to converted beams with different wavelengths. For example, the first wavelength conversion layer may convert a blue beam emitted by a laser light source to a green beam, and the second wavelength conversion layer may convert the blue beam emitted by the laser light source to a yellow beam, and the invention is not limited thereto.

In an aspect of the wheel 10 of this embodiment, the thermal conductivity film 200a and the optical layer 110 are formed on a same surface (the upper surface 100U of the substrate 100) of the substrate 100, and the thermal conductivity film 200a is disposed between the substrate 100 and the optical layer 110. Therefore, the thermal conductivity film 200a may accelerate the conduction of heat generated by the wheel 10 during operation, and improve the heat dissipation effect of the wheel 10.

Figure 3:
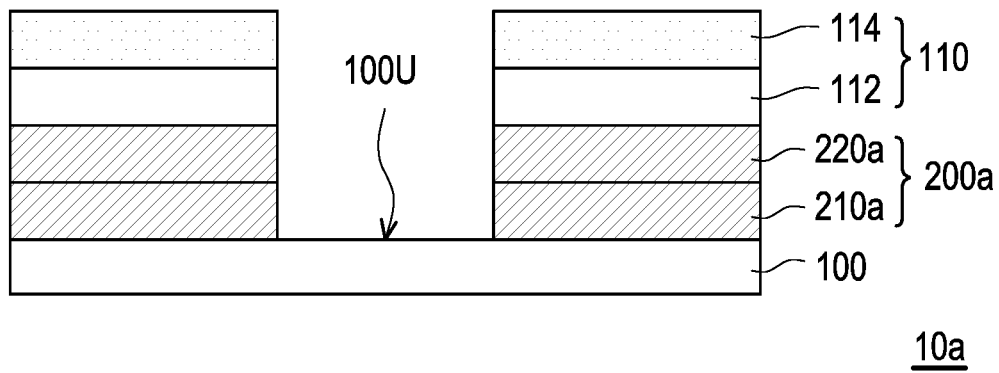

Referring to FIG. 3, FIG. 3 illustrates a schematic cross-sectional view of a portion of a wheel according to an embodiment of the invention. The difference between a wheel 10a of this embodiment and the wheel 10 shown in FIG. 2 is that: the thermal conductivity film 200a includes a first thermal conductivity film 210a and a second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high. Specifically, the thermal conductivity film 200a of this embodiment includes two kinds of thermally conductive particles, and the first thermal conductivity film 210a and the second thermal conductivity film 220a respectively include different kinds of thermally conductive particles. In this embodiment, for the purpose of optimizing thermal conductivity, the thermal conductivity of the first thermal conductivity film 210a is smaller than that of the second thermal conductivity film 220a. For example, the first thermal conductivity film 210a may include copper particles, and the second thermal conductivity film may include silver particles. In some embodiments, the volume ratio of the first thermally conductive particles in the first thermal conductivity film 210a to the second thermally conductive particles in the second thermal conductivity film 220a is 1:9 to 9:1, preferably 1:9 to 5:5. The design of multiple thermal conductivity films of the embodiment not only has good thermal conductivity, but also improves the adhesive property between the substrate 100 and the optical layer 110.

Figure 4:
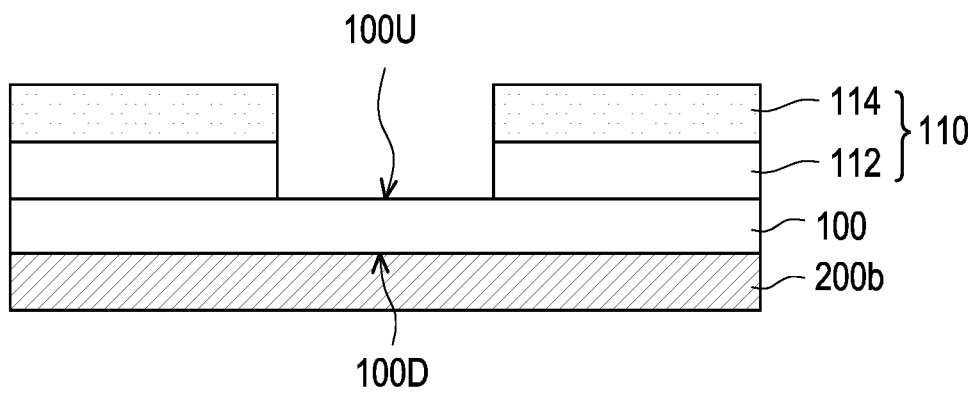

Referring to FIG. 4, FIG. 4 illustrates a schematic cross-sectional view of a portion of a wheel according to an embodiment of the invention. The difference between a wheel 10b of this embodiment and the wheel 10 shown in FIG. 2 is that: a thermal conductivity film 200b and the optical layer 110 are respectively disposed on opposite surfaces of the substrate 100. In this embodiment, the thermal conductivity film 200b is disposed on a lower surface 100D of the substrate 100, and the optical layer 110 is disposed on the upper surface 100U of the substrate 100. In addition, the thermal conductivity film 200b of this embodiment is distributed on the entire lower surface 100D of the substrate 100. In this embodiment, disposing the thermal conductivity film 200b on the lower surface 100D of the substrate 100 may improve the convective heat dissipation effect of the wheel 10b. Those skilled in the art may choose the form of the thermal conductivity film to be formed according to the actual situation.

Figure 5:
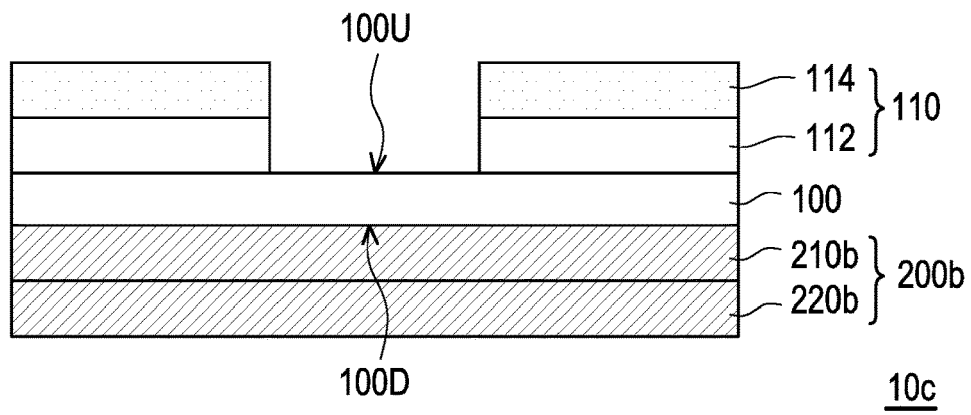

Referring to FIG. 5, FIG. 5 illustrates a schematic cross-sectional view of a portion of a wheel according to an embodiment of the invention. The difference between a wheel 10c of this embodiment and the wheel 10b shown in FIG. 4 is that: the thermal conductivity film 200b includes a first thermal conductivity film 210b and a second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high.

Figure 6:
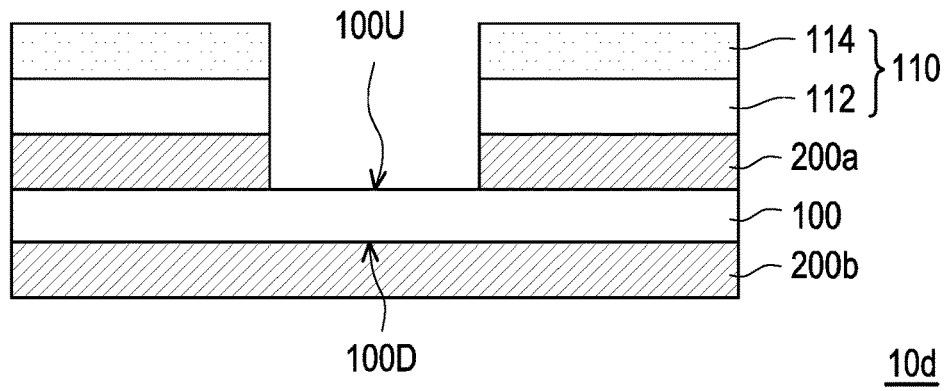

Referring to FIG. 6. FIG. 6 illustrates a schematic cross-sectional view of a portion of a wheel according to an embodiment of the invention. The difference between a wheel 10d of this embodiment and the wheel 10 shown in FIG. 2 is that: the thermal conductivity film includes the thermal conductivity film 200a and the thermal conductivity film 200b respectively disposed on opposite surfaces of the substrate 100, and the thermal conductivity film 200a is located between the substrate 100 and the optical layer 110. In this embodiment, the thermal conductivity film 200a is disposed on the upper surface 100U of the substrate 100, and the thermal conductivity film 200b is disposed on the lower surface 100D of the substrate 100. In addition, the thermal conductivity film 200b of this embodiment is distributed on the entire lower surface 100D of the substrate 100.

Figure 7:
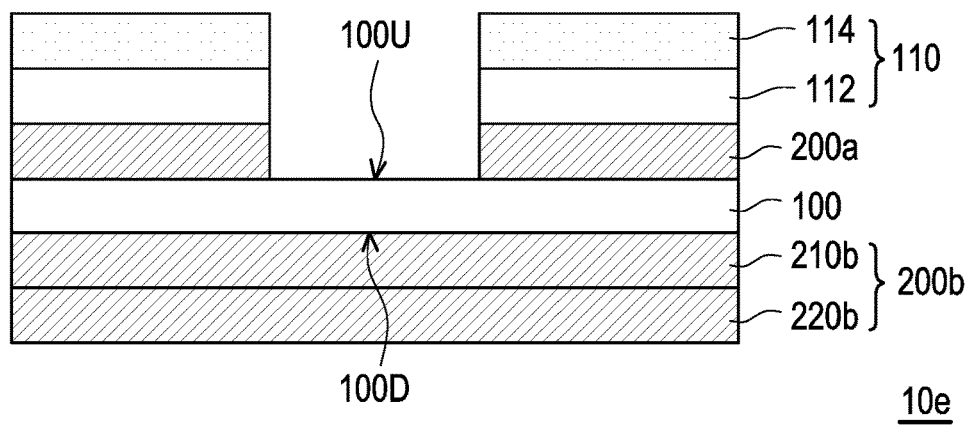

Referring to FIG. 7. FIG. 7 illustrates a schematic cross-sectional view of a portion of a wheel according to an embodiment of the invention. The difference between a wheel 10e of this embodiment and the wheel 10d shown in FIG. 6 is that: the thermal conductivity film 200b includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high.

Figure 8:
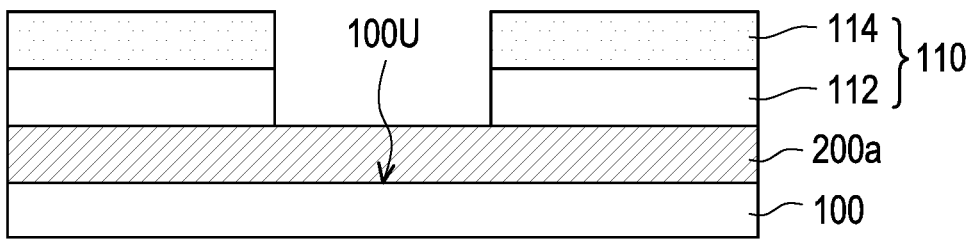

Referring to FIG. 8. FIG. 8 illustrates a schematic cross-sectional view of a portion of a wheel according to an embodiment of the invention. The difference between a wheel 10f of this embodiment and the wheel 10 shown in FIG. 2 is that: the thermal conductivity film 200a of the embodiment is distributed on the entire upper surface 100U of the substrate 100.

Figure 9:
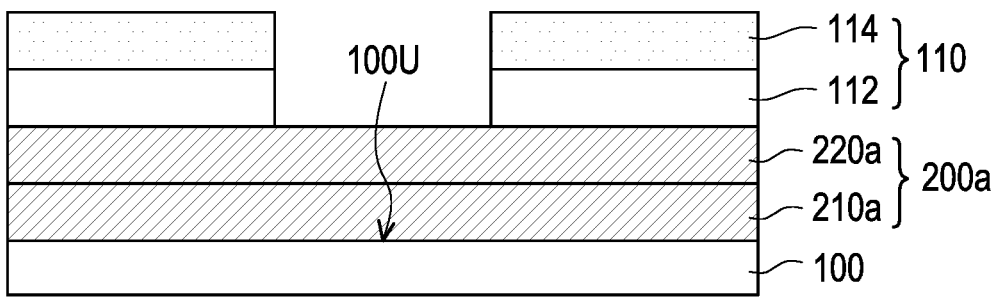

Referring to FIG. 9. FIG. 9 illustrates a schematic cross-sectional view of a portion of a wheel according to an embodiment of the invention. The difference between a wheel 10g of this embodiment and the wheel 10a shown in FIG. 3 is that: the first thermal conductivity film 210a of this embodiment is distributed on the entire upper surface 100U of the substrate 100, and the second thermal conductivity film 220a is distributed on an entire surface of the first thermal conductivity film 210a.

Figure 10:
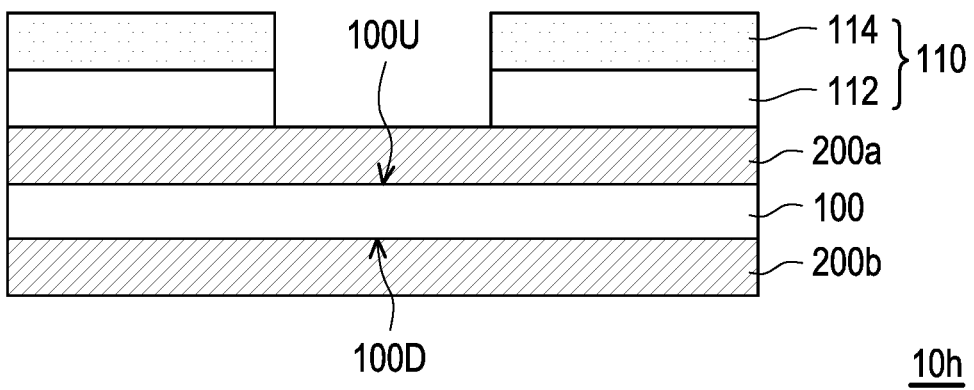

Referring to FIG. 10, FIG. 10 illustrates a schematic cross-sectional view of a portion of a wheel according to an embodiment of the invention. The difference between a wheel 10h of this embodiment and the wheel 10d shown in FIG. 6 is that the thermal conductivity film 200a of the embodiment is distributed on the entire upper surface 100U of the substrate 100.

Figure 11:
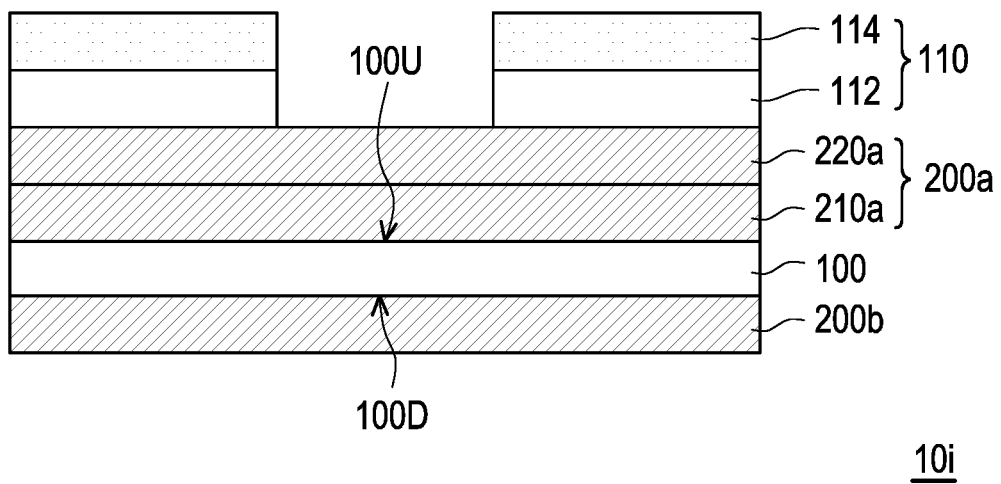

Referring to FIG. 11. FIG. 11 illustrates a schematic cross-sectional view of a portion of a wheel according to an embodiment of the invention. The difference between a wheel 10i of this embodiment and the wheel 10h shown in FIG. 10 is that: the thermal conductivity film 200a of this embodiment includes the first thermal conductivity film 210a and the second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high.

Figure 12:
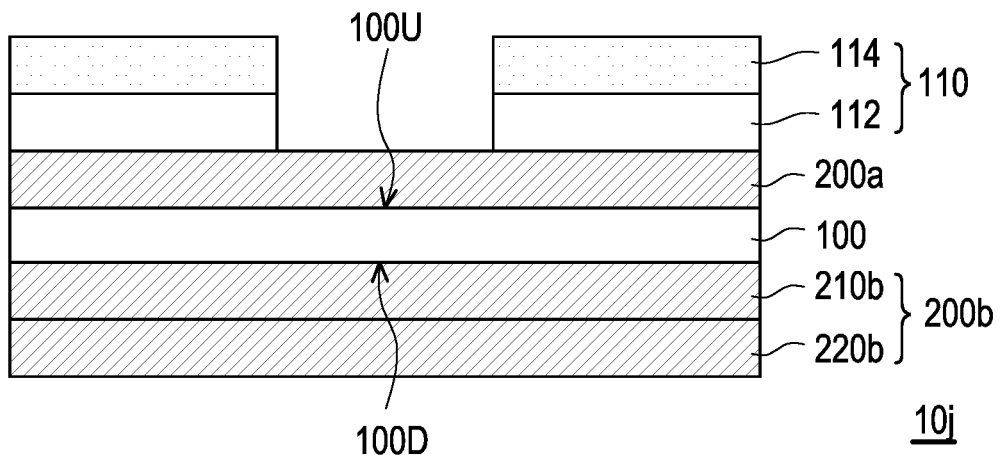

Referring to FIG. 12, FIG. 12 illustrates a schematic cross-sectional view of a portion of a wheel according to an embodiment of the invention. The difference between a wheel 10j of this embodiment and the wheel 10h shown in FIG. 10 is that: the thermal conductivity film 200b of this embodiment includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high.

Figure 13:
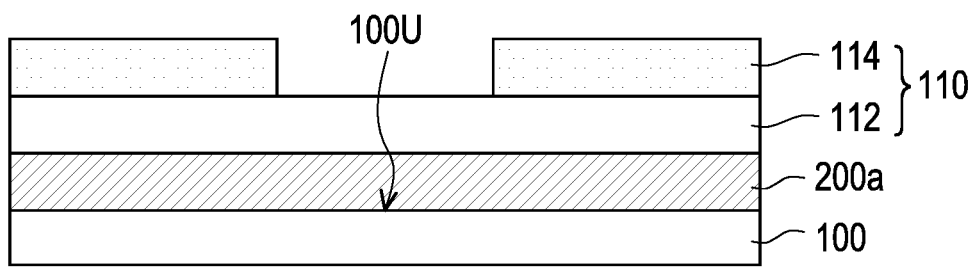

Referring to FIG. 13, FIG. 13 illustrates a schematic cross-sectional view of a portion of a wheel according to an embodiment of the invention. The difference between a wheel 10k of this embodiment and the wheel 10f shown in FIG. 8 is that: the reflective layer 112 of the embodiment is distributed on an entire surface of the thermal conductivity film 200a.

Figure 14:
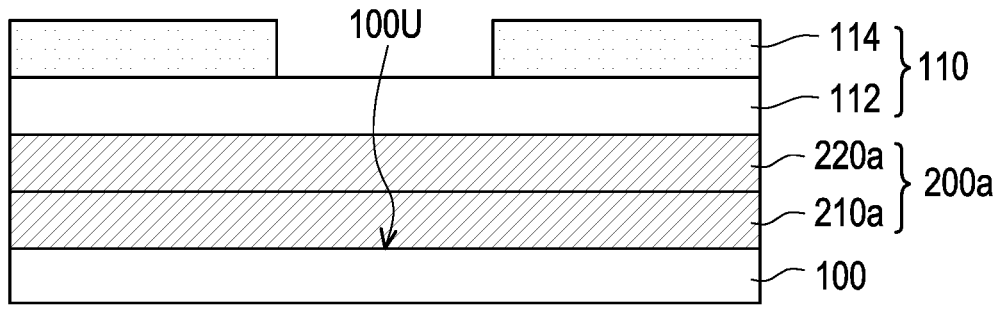

Referring to FIG. 14. FIG. 14 illustrates a schematic cross-sectional view of a portion of a wheel according to an embodiment of the invention. The difference between a wheel 10l of this embodiment and the wheel 10k shown in FIG. 13 is that: the thermal conductivity film 200a of this embodiment includes the first thermal conductivity film 210a and the second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high.

Figure 15:
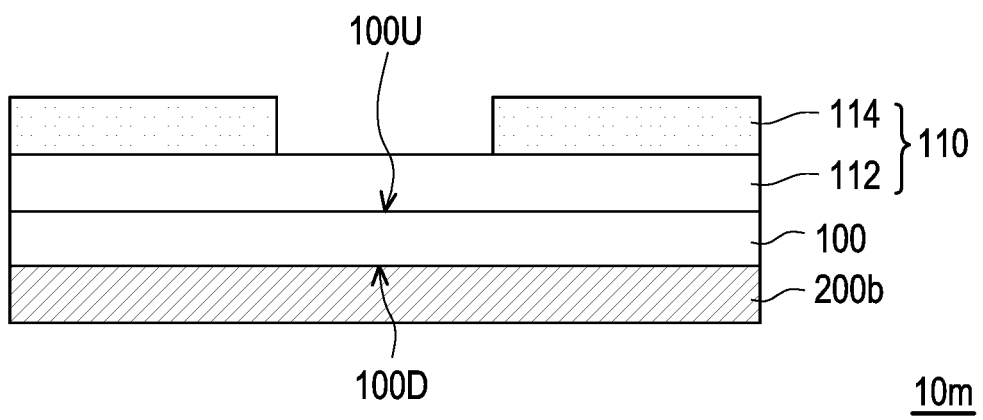

Referring to FIG. 15. FIG. 15 illustrates a schematic cross-sectional view of a portion of a wheel according to an embodiment of the invention. The difference between a wheel 10m of this embodiment and the wheel 10k shown in FIG. 13 is that: the thermal conductivity film 200b of this embodiment is disposed on the lower surface 100D of the substrate 100.

Figure 16:
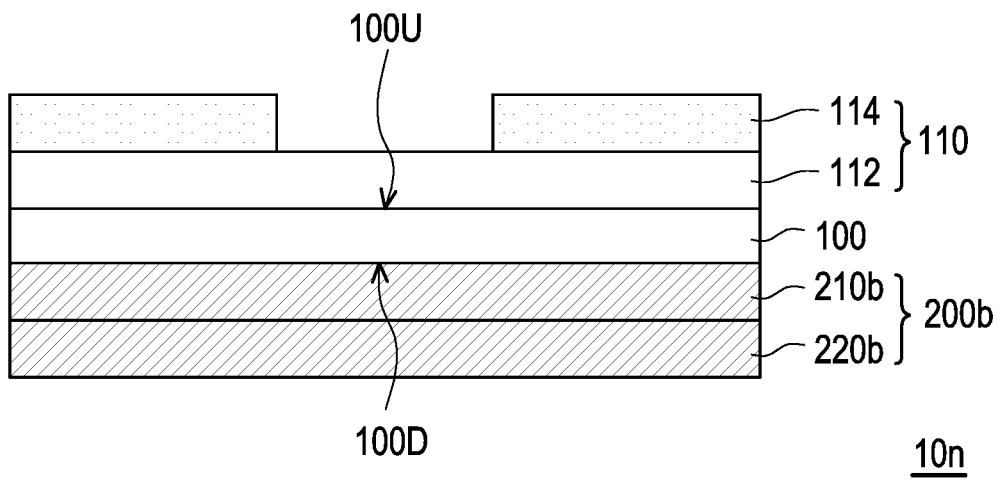

Referring to FIG. 16, FIG. 16 illustrates a schematic cross-sectional view of a portion of a wheel according to an embodiment of the invention. The difference between a wheel 10n of this embodiment and the wheel 10m shown in FIG. 15 is that: the thermal conductivity film 200b of the embodiment includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high.

Figure 17:
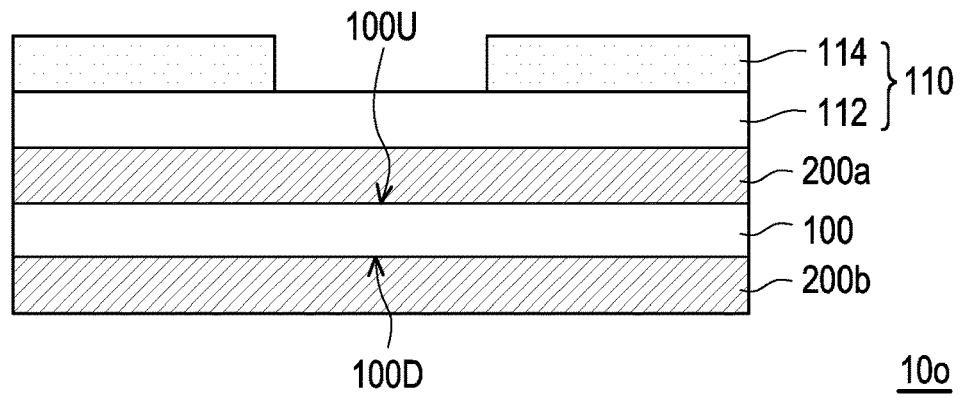

Referring to FIG. 17, FIG. 17 illustrates a schematic cross-sectional view of a portion of a wheel according to an embodiment of the invention. The difference between a wheel 10o of this embodiment and the wheel 10h shown in FIG. 10 is that: the reflective layer 112 of this embodiment is distributed on an entire surface of the thermal conductivity film 200a.

Figure 18:
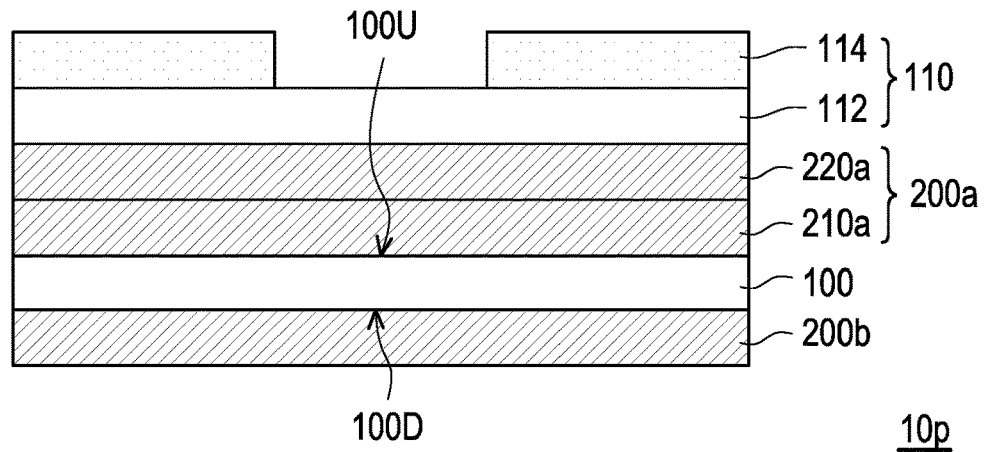

Referring to FIG. 18, FIG. 18 illustrates a schematic cross-sectional view of a portion of a wheel according to an embodiment of the invention. The difference between a wheel 10p of this embodiment and the wheel 10o shown in FIG. 17 is that: the thermal conductivity film 200a of this embodiment includes the first thermal conductivity film 210a and the second thermal conductivity film 220a respectively disposed on a same surface (the upper surface 100U of the substrate 100) of substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high.

Figure 19:
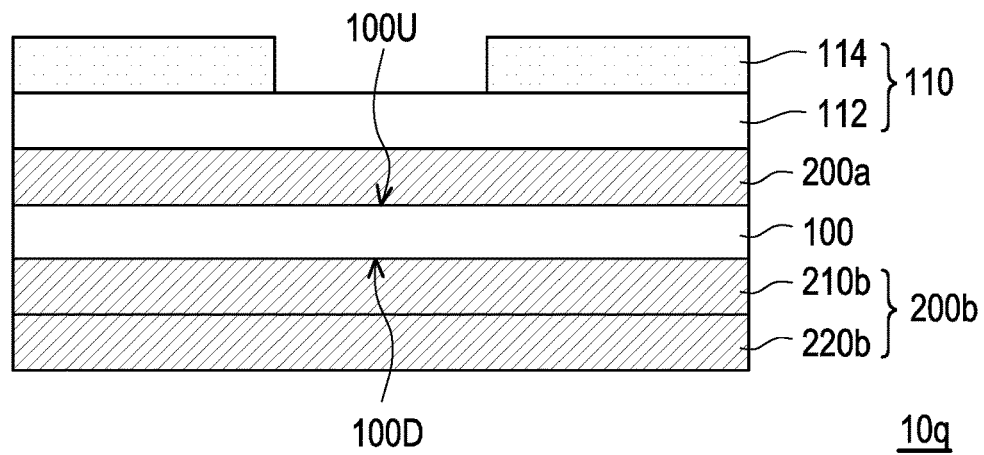

Referring to FIG. 19, FIG. 19 illustrates a schematic cross-sectional view of a portion of a wheel according to an embodiment of the invention. The difference between a wheel 10q of this embodiment and the wheel 10o shown in FIG. 17 is that: the thermal conductivity film 200b of the embodiment includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high.

Figure 20:
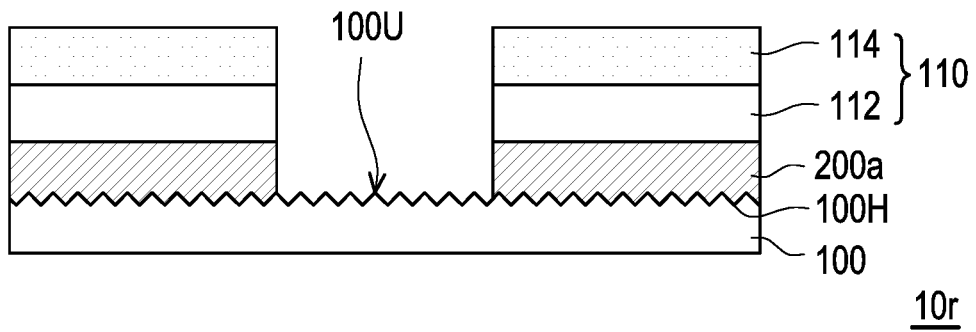

Referring to FIG. 20, FIG. 20 illustrates a schematic cross-sectional view of a portion of a wheel according to an embodiment of the invention. The difference between a wheel 10r of this embodiment and the wheel 10 shown in FIG. 2 is that: a surface of the substrate 100 has a plurality of voids 100H. In this embodiment, the plurality of voids 100H are formed on the upper surface 100U of the substrate 100. The substrate 100 may have a void rate of 30 to 50%, and the depth of the plurality of voids 100H may be 20 to 60 μm, for example. In addition, the thermal conductivity film 200a disposed on and in contact with the substrate 100 is configured to fill the voids 100H of the substrate 100. Based on the above, since the thermal conductivity film 200a is configured to fill the voids 100H of the substrate 100 and penetrate deep into the substrate 100, the design of the substrate 100 of the embodiment with the plurality of void 100H on the surface may further improve the thermal conductivity effect.

Figure 21:
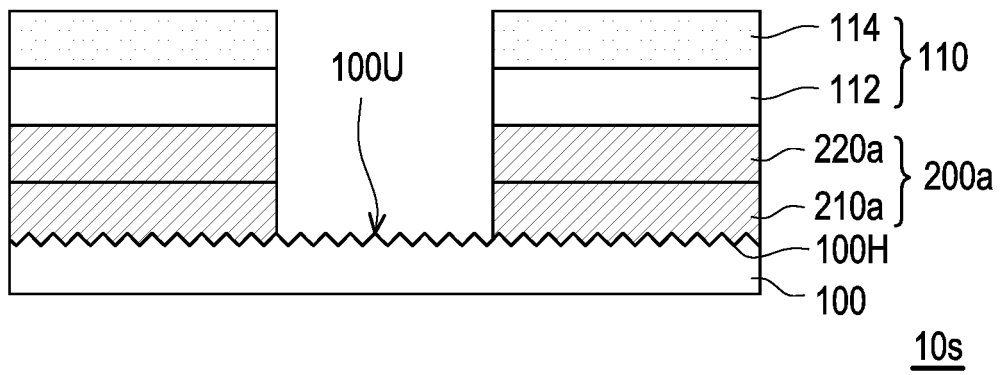

Referring to FIG. 21. FIG. 21 illustrates a schematic cross-sectional view of a portion of a wheel according to an embodiment of the invention. The difference between a wheel 10s of this embodiment and the wheel 10r shown in FIG. 20 is that: the thermal conductivity film 200a of this embodiment includes the first thermal conductivity film 210a and the second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high, and the first thermal conductivity film 210a is configured to fill the voids 100H of the substrate 100.

Figure 22:
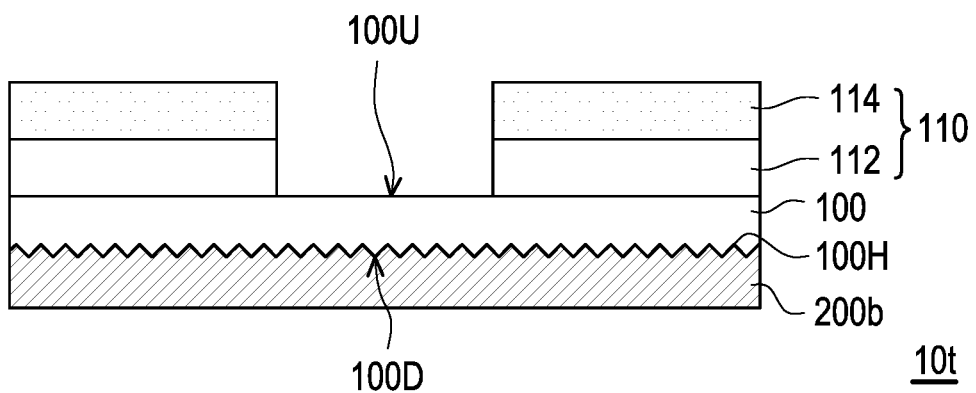

Referring to FIG. 22, FIG. 22 illustrates a schematic cross-sectional view of a portion of a wheel according to an embodiment of the invention. The difference between a wheel 10t of this embodiment and the wheel 10r shown in FIG. 20 is that: the plurality of voids 100H are formed on the lower surface 100D of the substrate 100, while no voids are formed on the upper surface 100U of the substrate 100. In addition, the thermal conductivity film 200b of this embodiment is disposed on the lower surface 100D of the substrate 100, and the thermal conductivity film 200b is configured to fill the voids 100H of the substrate 100. The thermal conductivity film 200b is distributed on the entire lower surface 100D of the substrate 100.

Figure 23:
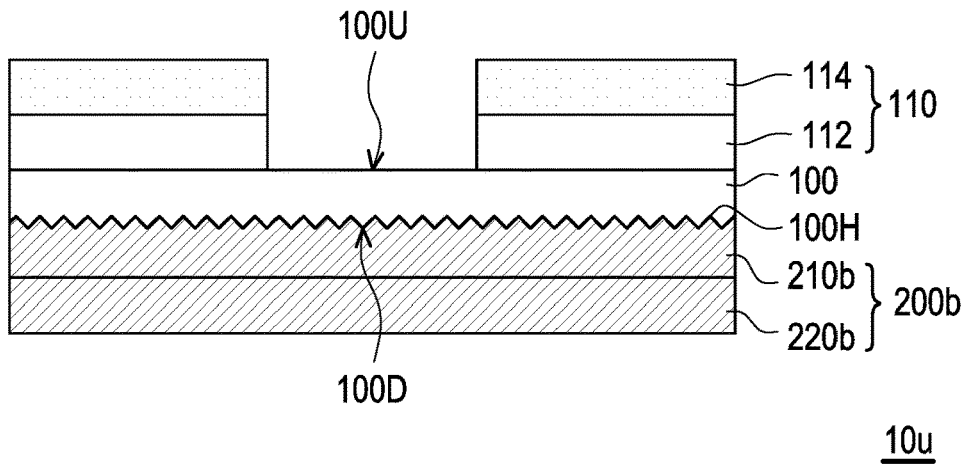

Referring to FIG. 23, FIG. 23 illustrates a schematic cross-sectional view of a portion of a wheel according to an embodiment of the invention. The difference between a wheel 10u of this embodiment and the wheel 10t shown in FIG. 22 is that: the thermal conductivity film 200b of this embodiment includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high, and the first thermal conductivity film 210b is configured to fill the voids 100H of the substrate 100.

Figure 24:
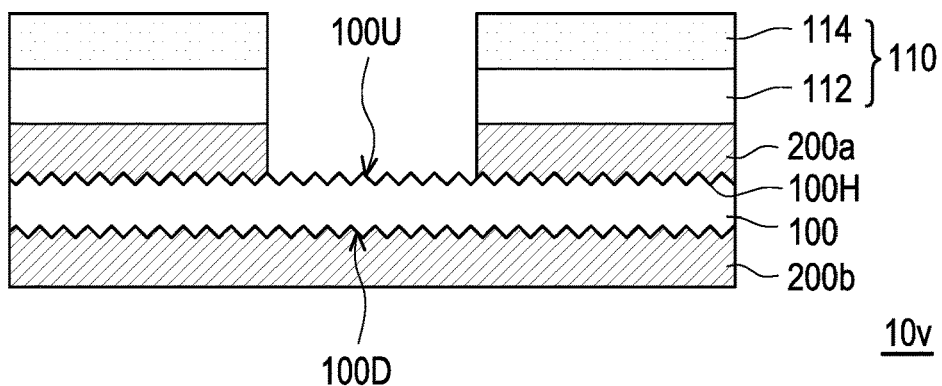

Referring to FIG. 24, FIG. 24 illustrates a schematic cross-sectional view of a portion of a wheel according to an embodiment of the invention. The difference between a wheel 10v in this embodiment and the wheel 10r shown in FIG. 20 is that: the plurality of voids 100H are further formed on the lower surface 100D of the substrate 100 of this embodiment, and the wheel 10v further includes the thermal conductivity film 200b disposed on the lower surface 100D of the substrate 100. The thermal conductivity film 200b of this embodiment is configured to fill the voids 100H of the substrate 100, and the thermal conductivity film 200b is distributed on the entire lower surface 100D of the substrate 100.

Figure 25:
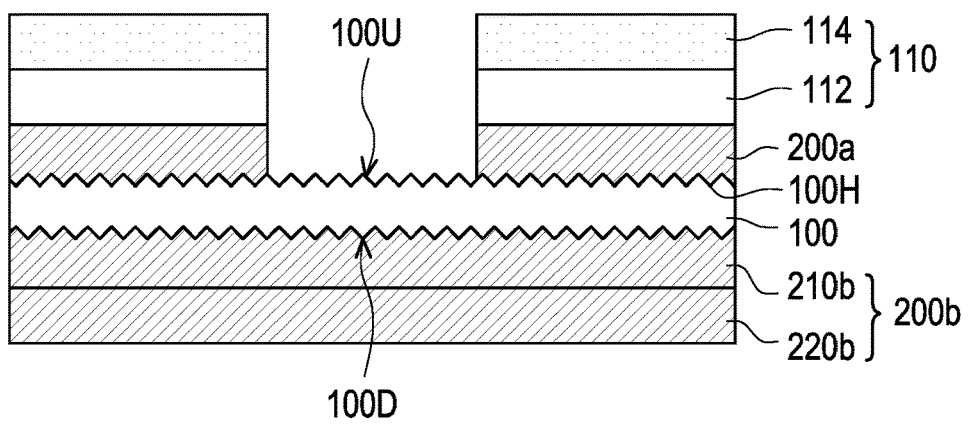

Referring to FIG. 25, FIG. 25 illustrates a schematic cross-sectional view of a portion of a wheel according to an embodiment of the invention. The difference between a wheel 10w in this embodiment and the wheel 10v shown in FIG. 24 is that: the thermal conductivity film 200b of this embodiment includes the first thermal conductivity film 210b and the second thermal conductivity film 220b respectively disposed on a same surface (the lower surface 100D of substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high, and the first thermal conductivity film 210b is configured to fill the voids 100H of the substrate 100.

Figure 26:
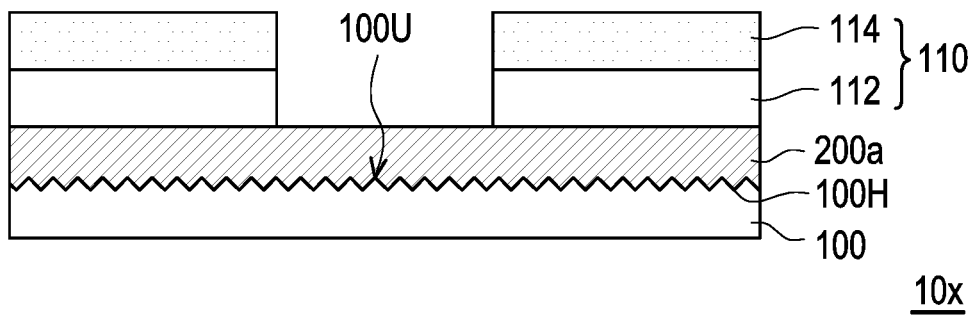

Referring to FIG. 26. FIG. 26 illustrates a schematic cross-sectional view of a portion of a wheel according to an embodiment of the invention. The difference between a wheel 10x of this embodiment and the wheel 10r shown in FIG. 20 is that: the thermal conductivity film 200a of this embodiment is distributed on the entire upper surface 100U of the substrate 100.

Figure 27:
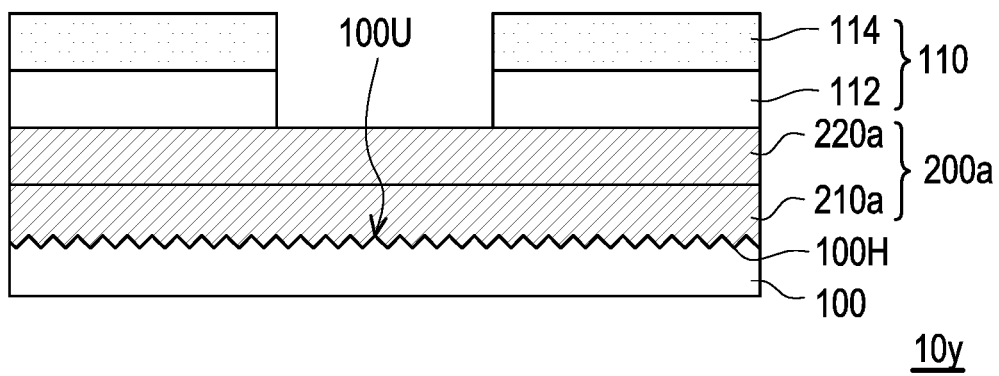

Referring to FIG. 27. FIG. 27 illustrates a schematic cross-sectional view of a portion of a wheel according to an embodiment of the invention. The difference between a wheel 10y in this embodiment and the wheel 10x shown in FIG. 26 is that: the thermal conductivity film 200a of this embodiment includes the first thermal conductivity film 210a and the second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high, and the first thermal conductivity film 210a is configured to fill the voids 100H of the substrate 100.

Figure 28:
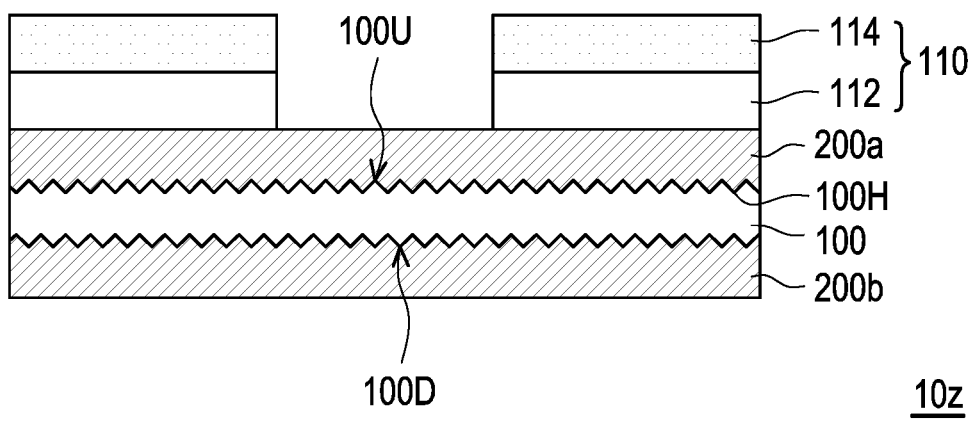

Referring to FIG. 28. FIG. 28 illustrates a schematic cross-sectional view of a portion of a wheel according to an embodiment of the invention. The difference between a wheel 10z in this embodiment and the wheel 10x shown in FIG. 26 is that: the plurality of voids 100H are further formed on the lower surface 100D of the substrate 100 of this embodiment, and the wheel 10v further includes the thermal conductivity film 200b disposed on the lower surface 100D of the substrate 100. The thermal conductivity film 200b of this embodiment is configured to fill the voids 100H of the substrate 100, and the thermal conductivity film 200b is distributed on the entire lower surface 100D of the substrate 100.

Figure 29:
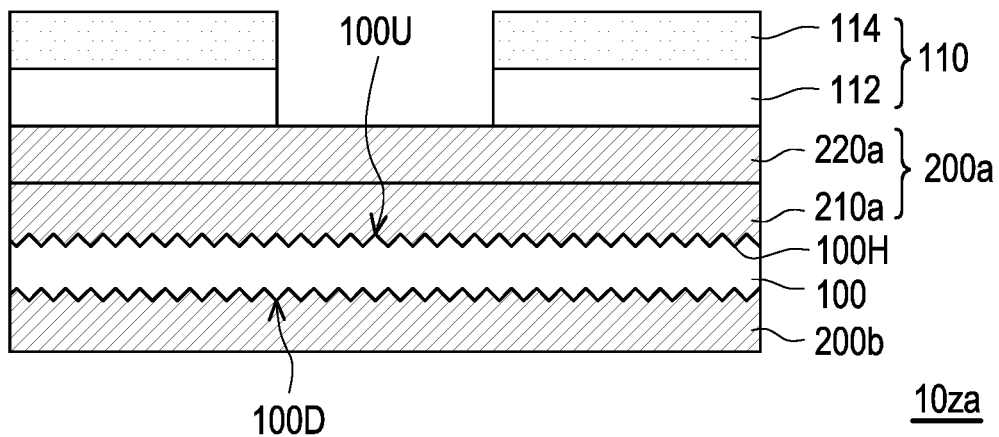

Referring to FIG. 29. FIG. 29 illustrates a schematic cross-sectional view of a portion of a wheel according to an embodiment of the invention. The difference between a wheel 10za in this embodiment and the wheel 10z shown in FIG. 28 is that: the thermal conductivity film 200a of this embodiment includes the first thermal conductivity film 210a and the second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high, and the first thermal conductivity film 210a is configured to fill the voids 100H of the substrate 100.

Figure 30:
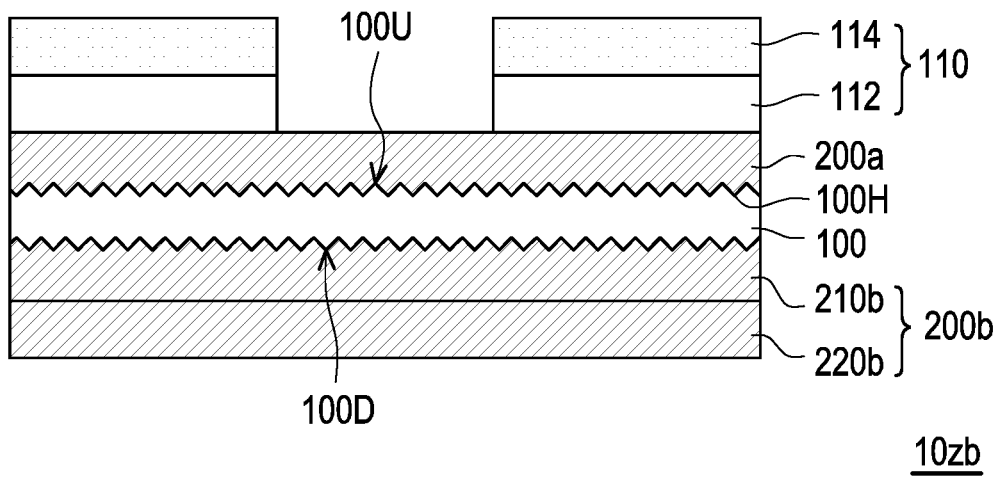

Referring to FIG. 30, FIG. 30 illustrates a schematic cross-sectional view of a portion of a wheel according to an embodiment of the invention. The difference between a wheel 10zb of this embodiment and the wheel 10z shown in FIG. 28 is that: the thermal conductivity film 200b of this embodiment includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high, and the first thermal conductivity film 210b is configured to fill the voids 100H of the substrate 100.

Figure 31:
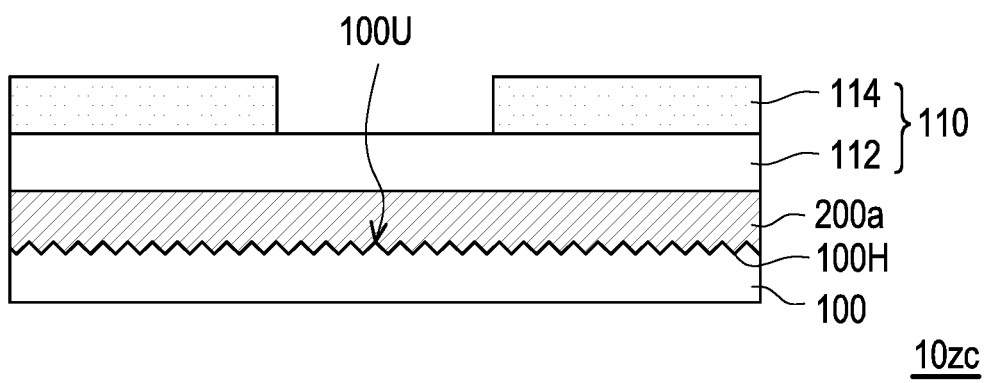

Referring to FIG. 31. FIG. 31 illustrates a schematic cross-sectional view of a portion of a wheel according to an embodiment of the invention. The difference between a wheel 10ze of this embodiment and the wheel 10r shown in FIG. 20 is that: the thermal conductivity film 200a of the embodiment is distributed on the entire upper surface 100U of the substrate 100, and the reflective layer 112 is distributed on the entire thermal conductivity film 200a.

Figure 32:
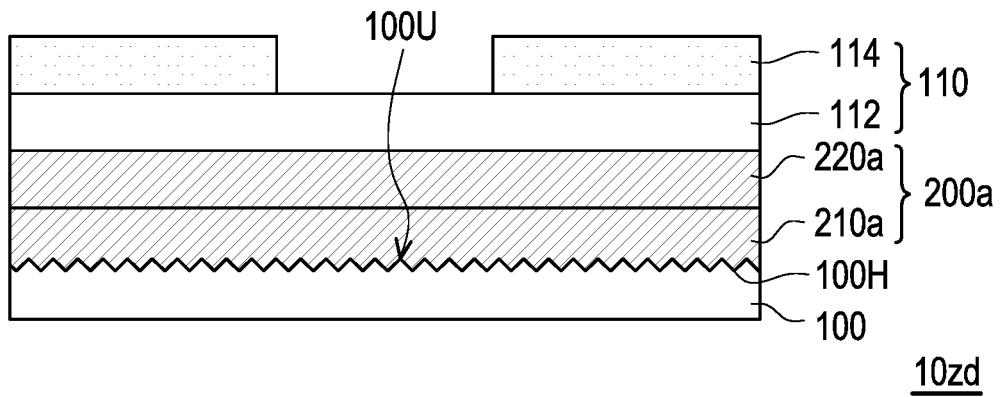

Referring to FIG. 32, FIG. 32 illustrates a schematic cross-sectional view of a portion of a wheel according to an embodiment of the invention. The difference between a wheel 10zd in this embodiment and the wheel 10ze shown in FIG. 31 is that: the thermal conductivity film 200a of this embodiment includes the first thermal conductivity film 210a and the second thermal conductivity film 220a respectively disposed on a same surface (the upper surface 100U of the substrate 100) of the substrate 100. The first thermal conductivity film 210a and the second thermal conductivity film 220a are disposed on the substrate 100 in such a way that a thermal conductivity of the first thermal conductivity film 210a and the second thermal conductivity film 220a is from low to high, and the first thermal conductivity film 210a is configured to fill the voids 100H of the substrate 100.

Figure 33:
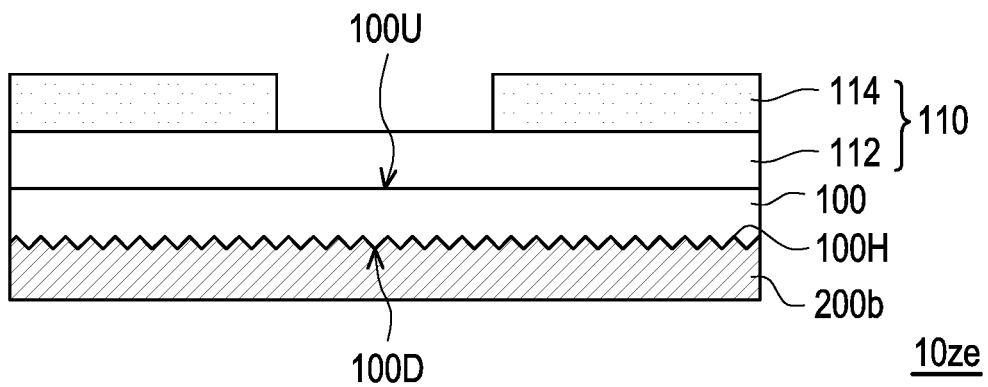

Referring to FIG. 33. FIG. 33 illustrates a schematic cross-sectional view of a portion of a wheel according to an embodiment of the invention. The difference between a wheel 10ze of this embodiment and the wheel 10ze shown in FIG. 31 is that: the plurality of voids 100H are formed on the lower surface 100D of the substrate 100, while no voids are formed on the upper surface 100U of the substrate 100. In addition, the thermal conductivity film 200b of this embodiment is disposed on the lower surface 100D of the substrate 100, and the thermal conductivity film 200b is configured to fill the voids 100H of the substrate 100. The thermal conductivity film 200b is distributed on the entire lower surface 100D of the substrate 100.

Figure 34:
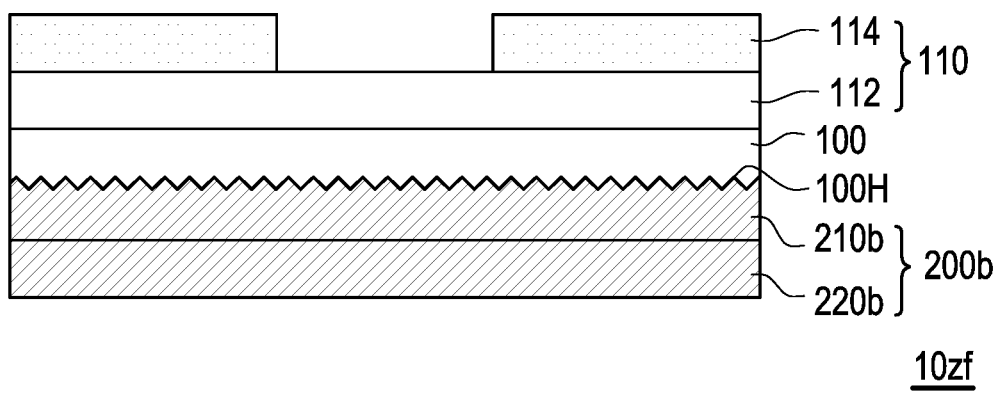

Referring to FIG. 34, FIG. 34 illustrates a schematic cross-sectional view of a portion of a wheel according to an embodiment of the invention. The difference between a wheel 10zf in this embodiment and the wheel 10ze shown in FIG. 33 is that: the thermal conductivity film 200b of this embodiment includes the first thermal conductivity film 210b and the second thermal conductivity film 220b respectively disposed on a same surface (the lower surface 100D of the substrate 100) of the substrate 100. The first thermal conductivity film 210b and the second thermal conductivity film 220b are disposed on the substrate 100 in such a way that a thermal conductivity of the first thermal conductivity film 210b and the second thermal conductivity film 220b is from low to high, and the first thermal conductivity film 210b is configured to fill the voids 100H of the substrate 100.

Figure 35:
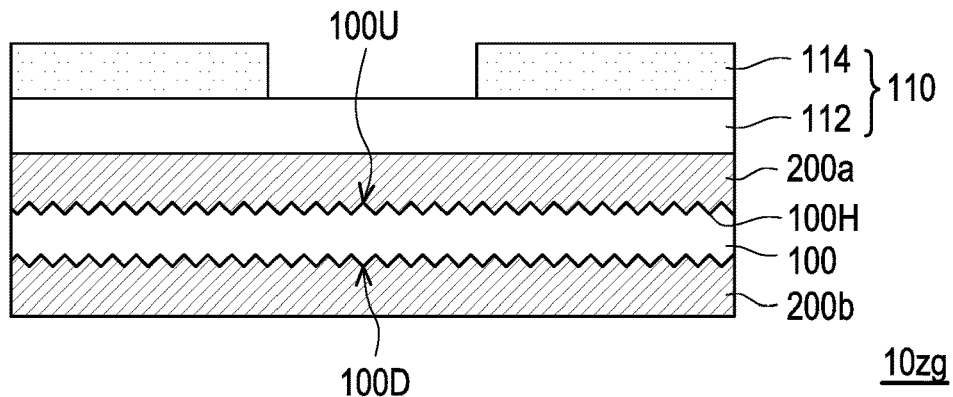

Referring to FIG. 35. FIG. 35 illustrates a schematic cross-sectional view of a portion of a wheel according to an embodiment of the invention. The difference between a wheel 10zg in this embodiment and the wheel 10ze shown in FIG. 31 is that: the plurality of voids 100H are further formed on the lower surface 100D of the substrate 100 of this embodiment, and the wheel 10zg further includes the thermal conductivity film 200b disposed on the lower surface 100D of the substrate 100. The thermal conductivity film 200b of this embodiment is configured to fill the voids 100H of the substrate 100, and the thermal conductivity film 200b is distributed on the entire lower surface 100D of the substrate 100.

Figure 36:
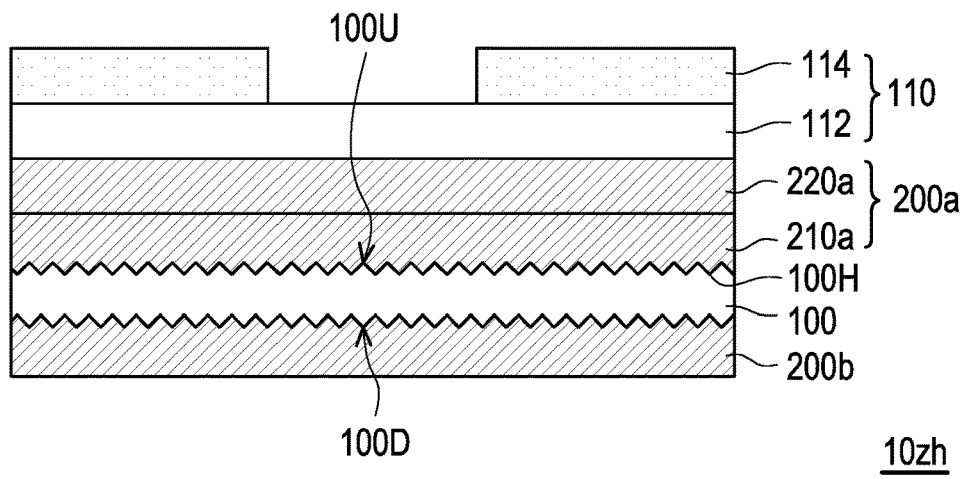

Referring to FIG. 36, FIG. 36 illustrates a schematic cross-sectional view of a portion of a wheel according to an embodiment of the invention. The difference between a wheel 10*zh* in this embodiment and the wheel 10*zg* shown in FIG. 35 is that: the thermal conductivity film 200*a* of this embodiment includes the first thermal conductivity film 210*a* and the second thermal conductivity film 220*a* respectively disposed on a same surface (the upper surface 100U of the substrate 100) of the substrate 100. The first thermal conductivity film 210*a* and the second thermal conductivity film 220*a* are disposed on the substrate 100 in such a way that a thermal conductivity of the first thermal conductivity film 210*a* and the second thermal conductivity film 220*a* is from low to high, and the first thermal conductivity film 210*a* is configured to fill the voids 100H of the substrate 100.

Figure 37:
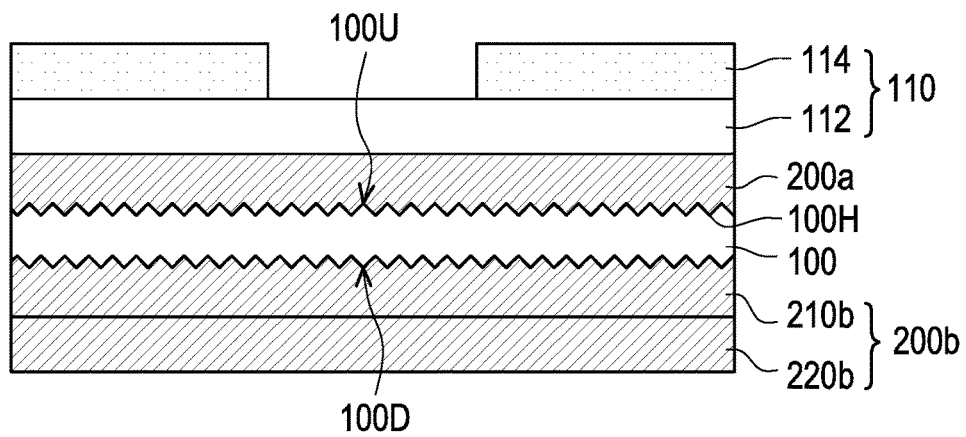

Referring to FIG. 37. FIG. 37 illustrates a schematic cross-sectional view of a portion of a wheel according to an embodiment of the invention. The difference between a wheel 10*zi* of this embodiment and the wheel 10*zg* shown in FIG. 35 is that: the thermal conductivity film 200*b* of this embodiment includes the first thermal conductivity film 210*b* and the second thermal conductivity film 220*b* respectively disposed on a same surface (the lower surface 100D of the substrate 100) of the substrate 100. The first thermal conductivity film 210*b* and the second thermal conductivity film 220*b* are disposed on the substrate 100 in such a way that a thermal conductivity of the first thermal conductivity film 210*b* and the second thermal conductivity film 220*b* is from low to high, and the first thermal conductivity film 210*b* is configured to fill the voids 100H of the substrate 100.

Figure 38:
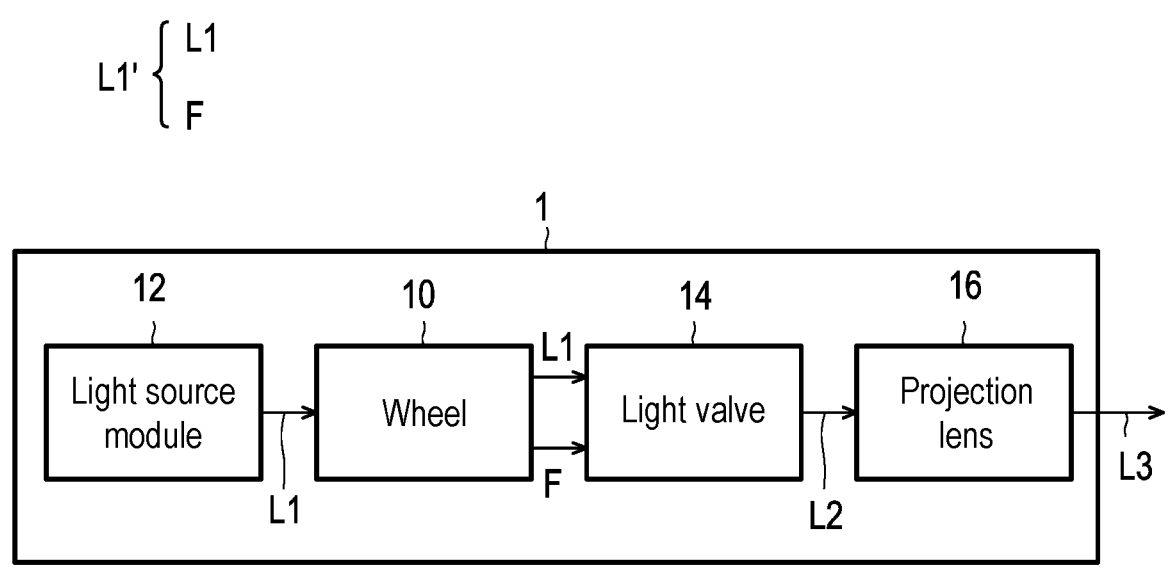
FIG. 38 is a schematic diagram of a projection apparatus according to an embodiment of the invention.

FIG. 38 is a schematic diagram of a projection apparatus according to an embodiment of the invention.

Referring to FIG. 38, a projection apparatus 1 of this embodiment includes a light source module 12, a wheel 10, a light valve 14, and a projection lens 16.

The light source module 12 is configured to provide an excitation beam L1. In this embodiment, the light source module 12 includes a laser light source. The laser light source is, for example, a laser diode (LD), a light emitting diode (LED), or other suitable light sources or a combination thereof. The excitation beam L1 may include ultraviolet light, blue light, or a combination thereof, but the invention is not limited thereto.

In some embodiments, the wheel 10 may be a phosphor wheel. The wheel 10 is disposed on a transmission path of the excitation beam L1, and different regions on the wheel 10 move to the transmission path of the excitation beam L1 in a time sequential manner. In a time interval, the excitation beam L1 is incident on the wavelength conversion layer 114 (shown in FIG. 2 to FIG. 37) of the wheel 10, and the excitation beam L1 is converted to a converted beam F. In another time interval, the wheel 10 is configured to guide the excitation beam L1 to the light valve 14. In other words, the converted beam F and the excitation beam L1 are transmitted from the wheel 10 to the light valve 14 in a time sequential manner. An illumination beam L1' includes at least one of the converted beam F and the excitation beam L1. The above-mentioned embodiment may be referred to for the relative positions and functions of the components included in wheel 10, which will not be repeated here. In addition, the wheel 10 may also be the wheel 10*a* to the wheel 10*zi* described in other embodiments.

In some embodiments, the projection apparatus 1 may further include a light splitting unit (not shown) disposed between the light source module 12 and the wheel 10. In other words, the light splitting unit is, for example, disposed on the transmission path of the excitation beam L1. The beam splitting unit includes an element that may split a beam. For example, the beam splitting unit may allow a blue beam to penetrate, and reflect beams of other colors. In this embodiment, the beam splitting unit may allow the blue excitation beam L1 to penetrate, so that the excitation beam L1 may penetrate the beam splitting unit and be incident on the wheel 10. The illumination beam L1' emitting out of the wheel 10 includes the excitation beam L1 and converted beam F generated in a time sequential manner.

The light valve 14 is disposed on a transmission path of the illumination beam L1' and is configured to convert the illumination beam L1' to an image beam L2. In some embodiments, the light valve 14 is a reflective optical modulator, such as a liquid crystal on silicon panel (LCoS panel) or a digital micro-mirror device (DMD). In other embodiments, the light valve 14 is a transmissive optical modulator, such as a transparent liquid crystal panel, an electro-optical modulator, a magneto-optic modulator, or an acousto-optic modulator (AOM). The invention is not limited thereto.

The projection lens 16 is disposed on a transmission path of the image beam L2 and is used to project a projection beam L3 out of the projection apparatus 1. In some embodiments, the projection lens 16 includes, for example, a set of one or more optical lenses having refractive power, such as a set of nonplanar lenses such as biconcave lenses, biconvex lenses, concave-convex lenses, convex-concave lenses, plano-convex lenses and plano-concave lenses, and so on. In other embodiments, the projection lens 16 may also include a planar optical lens, and the invention is not limited thereto. Based on the above, the projection lens 16 may convert the image beam L2 from the light valve 14 to the projection beam L3 through reflection or penetration and project the projection beam L3 out of the projection apparatus 1.

In summary, the embodiment of the invention has at least one of the advantages or effects as described below. Since in the wheel manufacturing method of each embodiment, cold spray or supersonic laser deposition is used to form the thermal conductivity film, the thermal conductivity film formed by the above process does not need a glue layer to be firmly fixed on the substrate, and the thermal conductivity film that is formed has a void rate of <1%, so that compared with a conventional thermal conductive layer having a glue layer, the thermal conductivity film is not affected by material characteristics (such as heat resistance, curing temperature, etc.) of the glue layer, and includes almost no cavity formed by air. The wheel of each embodiment of the invention has better heat conduction effect. In addition, since the driving element of the wheel of each embodiment of the invention does not need to bear the weight of the glue layer, the burden on the driving element may be reduced and the life span of the driving element may be increased. Furthermore, a plurality of thermally conductive particles included in the thermal conductivity film that is formed in each embodiment occupy >95% of the volume of the thermal conductivity film, so the thermal conductivity film includes almost no impurity and therefore has better thermal conductivity effect.

However, the foregoing is only the exemplary embodiment of the invention, and the scope of implementation of the invention is not limited thereto. Simple equivalent changes and modifications made according to the claims and the specification of the invention are all within the scope of the invention. In addition, any embodiment or claim of the invention does not need to achieve all the objectives or advantages or features disclosed in the invention. In addition, the abstract and title are only used to assist the search of patent documents, not to limit the scope claimed by the invention. In addition, the terms "first" and "second" mentioned in the specification or the claims are only used to name the elements or to distinguish between different embodiments or scopes, and are not used to limit the upper or lower limit of the number of elements.

What is claimed is:

1. A wheel manufacturing method, comprising:
providing a substrate;
forming a thermal conductivity film on at least one surface of the substrate, wherein the thermal conductivity film is formed by using cold spray or supersonic laser deposition to contact a plurality of thermally conductive particles with the substrate, the plurality of thermally conductive particles in the thermal conductivity film occupy >95% of a volume of the thermal conductivity film, and the thermal conductivity film has a void rate of <1%, wherein the thermal conductivity film comprises first thermally conductive particles and second thermally conductive particles, and a volume ratio of the first thermally conductive particles to the second thermally conductive particles is 1:9 to 9:1; and
forming an optical layer on the substrate or the thermal conductivity film.

2. The wheel manufacturing method according to claim 1, wherein the thermal conductivity film and the optical layer are formed on a same surface of the substrate, and the thermal conductivity film is disposed between the substrate and the optical layer.

3. The wheel manufacturing method according to claim 1, wherein the thermal conductivity film and the optical layer are respectively formed on opposite surfaces of the substrate.

4. The wheel manufacturing method according to claim 1, wherein the thermal conductivity film comprises a first thermal conductivity film and a second thermal conductivity film respectively formed on opposite surfaces of the substrate, and the first thermal conductivity film is disposed between the substrate and the optical layer.

5. The wheel manufacturing method according to claim 1, wherein a number of the thermal conductivity film is multiple, a plurality of the thermal conductivity films are formed on at least one surface of the substrate, and the plurality of thermal conductivity films are disposed on the substrate in such a way that a thermal conductivity of the plurality of thermal conductivity films is from low to high.

6. A wheel, comprising:
a substrate;
a thermal conductivity film, disposed on at least one surface of the substrate and in contact with the substrate, wherein the thermal conductivity film comprises a plurality of thermally conductive particles, and the plurality of thermally conductive particles in the thermal conductivity film occupy >95% of a volume of the thermal conductivity film, wherein the thermal conductivity film has a void rate of <1%, wherein the thermal conductivity film comprises first thermally conductive particles and second thermally conductive particles, and a volume ratio of the first thermally conductive particles to the second thermally conductive particles is 1:9 to 9:1; and
an optical layer, disposed on the substrate or the thermal conductivity film.

7. The wheel according to claim 6, wherein the thermal conductivity film and the optical layer are disposed on a same surface of the substrate, and the thermal conductivity film is located between the substrate and the optical layer.

8. The wheel according to claim 6, wherein the thermal conductivity film and the optical layer are respectively disposed on opposite surfaces of the substrate.

9. The wheel according to claim 6, wherein the thermal conductivity film comprises a first thermal conductivity film and a second thermal conductivity film respectively disposed on opposite surfaces of the substrate, and the first thermal conductivity film is located between the substrate and the optical layer.

10. The wheel according to claim 6, wherein a number of the thermal conductivity film is multiple, a plurality of the thermal conductivity films are disposed on at least one surface of the substrate, and the plurality of thermal conductivity films are disposed on the substrate in such a way that a thermal conductivity of the plurality of thermal conductivity films is from low to high.

11. The wheel according to claim 6, wherein the plurality of thermally conductive particles of the thermal conductivity film comprise a metal particle, an inorganic particle, or a combination thereof.

12. The wheel according to claim 11, wherein the metal particle comprises a copper particle, a silver particle, a gold particle, or a combination thereof, and the inorganic particle comprises a graphene particle, a diamond particle, or a combination thereof.

13. The wheel according to claim 6, wherein a purity of the plurality of thermally conductive particles comprised in the thermal conductivity film is >99.5%.

14. The wheel according to claim 6, wherein a thermal conductivity of the thermal conductivity film is 300 to 5000 W/m·K.

15. The wheel according to claim 6, wherein a bonding strength between the plurality of thermally conductive particles is 10 to 50 MPa.

16. The wheel according to claim 6, wherein a surface of the substrate has a plurality of voids, a depth of the plurality of voids is 20 to 60 μm, the substrate has a void rate of 30 to 50%, and the plurality of voids are filled by the thermal conductivity film.

17. The wheel according to claim 6, wherein a particle size of the plurality of thermally conductive particles is 0.005 to 0.05 mm.

18. The wheel according to claim 6, wherein the thermal conductivity film has a maximum height roughness of >30 μm, and the thermal conductivity film has an arithmetic average roughness of >5 μm.

19. A projection apparatus, comprising:
a light source module, configured to provide an excitation beam;
a wheel, disposed on a transmission path of the excitation beam, wherein the wheel comprises:
a substrate;
a thermal conductivity film, disposed on at least one surface of the substrate and in contact with the substrate, wherein the thermal conductivity film comprises a plurality of thermally conductive particles, and the plurality of thermally conductive particles in the thermal conductivity film occupy >95% of a volume of the thermal conductivity film, wherein the thermal conductivity film has a void rate of <1%, wherein the thermal conductivity film comprises first thermally conductive particles and second thermally conductive particles, and a volume ratio of the first thermally conductive particles to the second thermally conductive particles is 1:9 to 9:1; and an optical layer, disposed on the substrate or the thermal conductivity film, wherein the excitation beam incident on the optical layer is converted to a converted beam;

a light valve, disposed on a transmission path of the excitation beam and the converted beam, and the light valve is configured to convert the excitation beam and the converted beam to an image beam; and a projection lens, disposed on a transmission path of the image beam, wherein the projection lens is configured to project the image beam out of the projection apparatus.

20. A wheel, comprising:

a substrate, wherein a surface of the substrate has a plurality of voids, a depth of the plurality of voids is 20 to 60 μm, the substrate has a void rate of 30 to 50%;

a thermal conductivity film, disposed on the surface of the substrate and in contact with the substrate, wherein at least one portion of the plurality of voids are filled by the thermal conductivity film, the thermal conductivity film comprises a plurality of thermally conductive particles, and the plurality of thermally conductive particles in the thermal conductivity film occupy >95% of a volume of the thermal conductivity film, wherein the thermal conductivity film has a void rate of <1%; and an optical layer, disposed on the substrate or the thermal conductivity film.

* * * * *